(No Model.)
J. McADAMS.
MEANS FOR SINKING CAISSONS IN THE GROUND.
No. 587,126. Patented July 27, 1897.
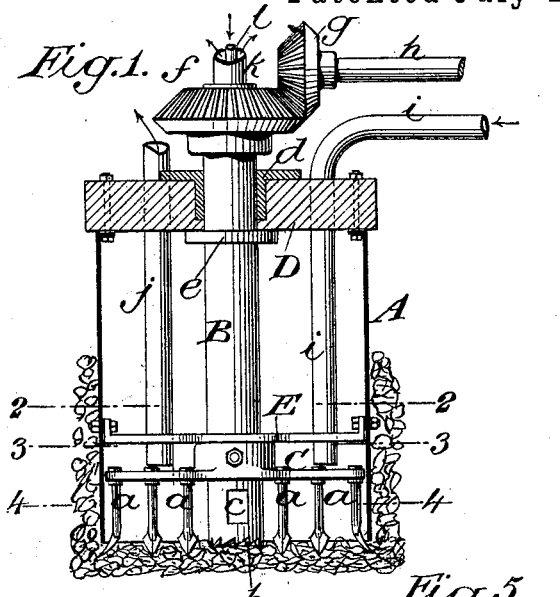
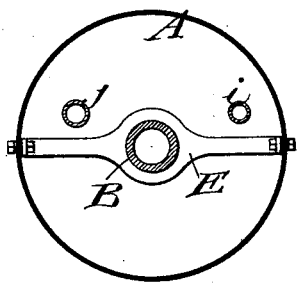
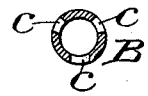
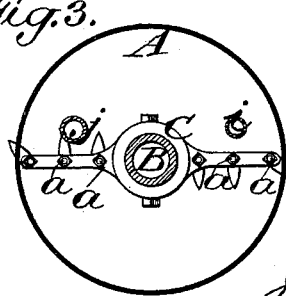
Witnesses:—
George Barry Jr.
Edward Vieser
Inventor:
James McAdams
by attorneys
Brown & Seward

UNITED STATES PATENT OFFICE.

JAMES McADAMS, OF NEW YORK, N. Y., ASSIGNOR OF ONE-HALF TO MAX AUGSBURGER, OF BROOKLYN, NEW YORK.

MEANS FOR SINKING CAISSONS IN THE GROUND.

SPECIFICATION forming part of Letters Patent No. 587,126, dated July 27, 1897.

Application filed February 18, 1897. Serial No. 624,019. (No model.)

*To all whom it may concern:*

Be it known that I, JAMES McADAMS, of the city and county of New York, in the State of New York, have invented new and useful Improvements in Means for Sinking Caissons in the Ground, of which the following is a specification.

A machine or device embodying my invention comprises means for disintegrating the ground within the circumference of the caisson and means for removing the disintegrated matter from within the caisson by the introduction among the disintegrated particles of sufficient water to bring said particles to a state of pulp or render them amenable to the action of a pump or other apparatus of similar character, by which they are withdrawn from the interior of the caisson.

I will first describe my invention in detail with reference to the accompanying drawings, and afterward point out its novelty in claims.

Figure 1 represents a central vertical section of a cylindrical caisson and an elevation of an apparatus embodying my invention applied thereto. Fig. 2 represents a horizontal section in the line 2 2 of Fig. 1; Fig. 3, a horizontal section in the line 3 3 of Fig. 1; Fig. 4, a horizontal section of the central shaft of the apparatus in the line 4 4 of Fig. 1. Fig. 5 represents a side view of one of the teeth of the plow which constitutes one of the features of my apparatus.

Similar letters of reference designate corresponding parts in all the figures.

A is the caisson, consisting of a cylinder open at top and bottom.

B is the tube, constituting the shaft, which is hollow throughout its whole length and open at the top and bottom. On the lower part of this shaft is a cross-head C, in which are strong teeth $a$ of any suitable form—for instance, like the teeth of a cultivating-plow—the said cross-head and teeth constituting a plow for the purpose of plowing or tearing up and disintegrating the ground at the bottom of the caisson. One or more of the said teeth should project slightly beyond the circumference of the caisson, as shown in Fig. 1, to make sufficient clearance for the descent of the caisson. The lower edge $b$ of the shaft, which is about on a level with the points of the plow-teeth $a$, is toothed or serrated for the same purpose of tearing up and disintegrating the ground. The hollow shaft or tube B is represented (see Figs. 1 and 4) as having lateral openings $c$.

The shaft B is set up centrally within the caisson in guides or bearings D and E. The upper guide D consists of a beam placed across and secured in any suitable manner to the top of the caisson and containing a bushing $d$ for the shaft or tube B. The lower guide E consists of a yoke which is loosely fitted to the shaft and placed across the caisson above the plow $C^a$ and secured in any suitable manner to the sides of the caisson. The said shaft or tube is furnished with an external collar or shoulder $e$ below the guide or bearing D for the purpose of holding down the shaft with the plow-teeth slightly below the lower edge of the caisson. The weight of the caisson to be sunk is thus all supported on the shaft and brought to bear thereon for assisting in giving to the latter the necessary pressure to force the plow-teeth into the ground within the caisson.

Any suitable means may be provided for giving rotary motion to the shaft or tube B and attached plow—as, for example, a bevel-gear $f$ on the shaft or tube, gearing with a bevel-gear $g$ on a suitable driving-shaft $h$.

Any suitable means may be provided for the introduction of water into the caisson outside the shaft or tube and the withdrawal of such water therefrom charged with the solid matter disintegrated and stirred up by the plow. Any suitable means may be likewise provided for introducing water into the shaft or tube B, at the upper end thereof, and for withdrawing the said water with the disintegrated solid matter with which it is charged. I have represented in Figs. 1, 2, and 3 a hose $i$ for introducing water into the caisson and a suction-pipe $j$ of a centrifugal or other pump for withdrawing the water and disintegrated matter therefrom. For introducing water into and withdrawing it through the tube or shaft I have represented in Fig. 1 the pipes $k\ l$ of what is known as an "air-lift" apparatus.

The operation of this apparatus is as follows: Rotary motion being given to the hollow shaft B and plow $C^a$ and a copious supply of water being introduced into the caisson, the plow and the serrated lower edge of the shaft tear up and disintegrate the ground at the bottom within and under the lower edge of the caisson, the plow at the same time stirring up the disintegrated matter in the water and reducing it to a state of pulp or keeping it in suspension therein while the pump draws the water and disintegrated matter from the caisson by the pipe $j$. If the air-lift or other water-elevating device applied within the hollow shaft B is also used, the water which flows from the caisson into the said shaft through the openings $c$ is drawn upward from the said shaft, carrying with it such of the matter disintegrated by the teeth at the lower edge of the said shaft as enters the said shaft at the bottom or through its lateral openings $c$. If the water be drawn off only through the pipe $j$, it will take with it not only the matter disintegrated outside of the shaft, but that which passes out from the shaft through the openings $c$, the said openings providing for a free circulation of water between the interior of the shaft and the surrounding space in the caisson.

As the ground is torn up within and around the edge of the caisson the caisson will descend by its own weight and the aid of the weight of the shaft B and its attached disintegrating appliances and of the guides attached to the caisson for the centering of the said shaft and attached appliances.

After the caisson has been sunk to the requisite depth the guides D E can be unbolted from it, and then the guides and the shaft and its attached disintegrating appliances can all be removed from the caisson, leaving the latter in the ground.

This invention is intended more particularly for the sinking of caissons to serve as foundations for buildings.

What I claim as my invention is—

1. A device for use in sinking a caisson by disintegrating the ground within it and removing the disintegrated matter from it, comprising a rotary shaft hollow throughout and open at top and bottom and having unobstructed lateral openings, a plow affixed to the lower part of said shaft, and guides for said shaft attached directly to the caissons to be sunk, substantially as herein described.

2. A device for use in sinking a caisson by disintegrating the ground within it and removing the disintegrated matter from it, comprising a rotary shaft hollow throughout and open at top and bottom and having lateral openings in its lower part, a plow affixed to said shaft above said lateral openings, and guides for said shaft attached directly to the caisson to be sunk, substantially as herein described.

3. A device for use in sinking a caisson comprising a rotary shaft hollow throughout and open at top and bottom and having lateral openings and an external shoulder, a plow affixed to said shaft, and a guide for the said shaft attached to the caisson to be sunk and supporting the latter upon the shoulder of the shaft, substantially as herein described.

4. A device for use in sinking a caisson by disintegrating the ground within it and removing the disintegrated matter from it, comprising a rotary shaft hollow throughout and open at top and bottom and having lateral openings in the lower part thereof, a plow affixed to said shaft, guides for said shaft attached directly to the caisson to be sunk, and means for introducing water to the caisson and into said shaft and for withdrawing from the caisson and shaft the said water and the disintegrated matter, substantially as herein described.

JAMES McADAMS.

Witnesses:
FREDK. HAYNES,
B. B. SEWARD.